United States Patent Office 3,113,022
Patented Dec. 3, 1963

3,113,022
ELECTROPHOTOGRAPHIC PROCESS
Paul Maria Cassiers and Jean Marie Nys, Mortsel-Antwerp, and Jozef Frans Willems and René Maurice Hart, Wilrijk-Antwerp, Belgium, assignors to Gevaert Photo-Producten N.V., Mortsel-Antwerp, Belgium, a Belgian company
No Drawing. Filed Apr. 22, 1960, Ser. No. 23,917
Claims priority, application Great Britain Apr. 22, 1959
4 Claims. (Cl. 96—1)

The present invention relates to electrophotography.

More particularly the present invention relates to a process of electrophotographically producing images which comprises exposing to a light- or other radiation-image a photoconductive material the conductivity of which is selectively increased by the radiation and which is capable of retaining the resulting latent image for a period of time in the dark.

Such a method has already been described in United States Patent 2,845,348, according to which an electrophotographic material comprising an uncharged thin layer containing a photoconductive phosphor such as zinc cadmium sulphide phosphor or zinc cadmium selenide phosphor is exposed to an image to form a latent image of conductivity in said thin layer, then electrically charged in darkness and finally developed and fixed in known way to produce a permanent print.

The method disclosed in United States Patent 2,845,348 shows many advantages over the known electrophotographic processes involving the selective image-wise exposure and discharge of an overall electrostatic charge stored in or on an electrophotographic material to yield an electrostatic latent image such as e.g. the possibility of exposing the electrophotographic material in places where no facilities for electrostatic charging are available, and developing the picture at any convenient time subsequent thereto without degrading the accuracy and quality of the original image.

The electrophotographic materials, however, disclosed in said United States patent shows many insufficiencies. Indeed, due to the grained state of the inorganic phosphors used therein either in natural crystalline form or in powdered form, the electrophotographic materials with sufficiently high sensitivity have an insufficient high dissolving power and vice versa. Further, these electrophotographic materials need be sensitized or resensitized prior to the image-wise exposure by a preliminary exposure to an infrared radiation. Finally it is still an art to obtain zinc cadmium sulfide or zinc cadmium selenide phosphors with the required properties so that the manufacture of such phosphors on an industrial scale is rather difficult.

It has now been found that latent conductive images with improved properties and which lend themselves to new and usable applications can be obtained by exposure to a light- or other suitable radiation-image of an electrophotographic material comprising a photoconductive layer or sheet mainly consisting of an organic polymeric photoconductive substance and containing also in a minor amount a radiation sensitive substance which produces a remanent increase of the conductivity in the irradiated areas of the photoconductive layer or sheet.

Although in principle any organic polymeric photoconductive substance may be used in the manufacture of the electrophotographic materials for obtaining latent conductive images according to the method of the present invention, the following classes of polymeric substances have up to now been found to be especially useful:

(A) In the class of the vinyl polymers and copolymers.

(I) The vinyl polymers and copolymers of the type disclosed in U.S. patent application Serial No. 11,128, filed February 26, 1960, for instance:

(1) Polymeric acetals such as

Polyvinylformal
Polyvinylacetal
Polyvinylbutyral
Poly[vinyl-(2-pyridine-aldehyde)-acetal]
Poly[vinyl-(4-pyridine-aldehyde)-acetal]
Poly(vinyl-furfural-acetal)
Poly[vinyl-(2-quinoline-aldehyde)-acetal].

(2) Vinyl polymers and copolymers containing unsaturated groups in the side chain such as Polyvinylcinnamate
Copolymer of ethylene and (p-styryl)-maleic acid monoanilide
Copolymer of styrene and p-(N-acrylyl)-aminostilbene.

(3) Vinyl polymers and copolymers containing a heterocyclic or an aromatic polycyclic nucleus in the side chain such as Poly[2-methyl-6-(N-acrylyl)-aminobenzothiazole]
Poly[2-(4'-acrylyloxyphenyl)-4-(4''-dimethylaminophenyl)-5-phenylimidazole]
Reaction product of polyacroleine and 1-aminoanthraquinone
Poly(1-vinylnaphthalene).

(4) Vinyl polymers and copolymers such as

Polyvinylacetate
Polymethylmethacrylate
Terpolymer of vinylchloride, vinylacetate and vinyl alcohol
Terpolymer of vinylchloride, vinylacetate and maleic anhydride
Copolymer of vinylacetate and mono-n-decylmaleate
Copolymer of vinylacetate and vinylstearate
Copolymer of styrene and butadiene
Copolymer of styrene and acrylonitrile
Copolymer of methacrylic acid and methylmethacrylate
Copolymer of methacrylic acid and acrylonitrile
Copolymer of methacrylic acid and styrene
Copolymer of vinylidene chloride and acrylonitrile
Copolymer of nitrostyrene and diethylmaleate.

(II) The vinyl polymers and copolymers of the type disclosed in U.S. patent application Serial No. 11,129, filed February 26, 1960, such as Poly(N-vinylcarbazole)
Poly(N-acrylylcarbazole)
Copolymer of N-vinylcarbazole and styrene
Graft copolymer of N-vinylcarbazole and polystyrene
Copolymer of N-vinylcarbazole and vinylidene chloride
Copolymer of N-vinylcarbazole and ethylacrylate
Copolymer of N-vinylcarbazole and methylacrylate
Copolymer of N-vinylcarbazole and acrylonitrile
Graft copolymer of N-vinylcarbazole and polyvinylbutyral
Copolymer of N-vinylcarbazole and glycidyl methacrylate.

III. The vinyl polymers and copolymers of the type disclosed in U.S. patent application Serial No. 11,130, filed February 26, 1960, such as Poly(vinylbenzal acetophenone)
Poly(vinylanisal acetophenone)
Reaction product poly(N-vinylacetylcarbazole) and N-ethyl-carbazole-2-aldehyde
Reaction product poly(N-vinylacetylcarbazole) and N-methyl-phenothiazine-2-aldehyde
Reaction product polyvinylacetophenone and quinoline-2-aldehyde Reaction product polyvinylacetophenone and 9-anthraldehyde Reaction product polyvinylacetophenone and p-dimethyl-amino-cinnamic aldehyde Reaction product polyvinylacetophenone and methylcarbazole-2-aldehyde Reaction product polyvinylacetophenone and 1-naphthaldehyde.

IV. The vinyl polymers and copolymers obtained by reacting halogenated polymers or copolymers with compounds containing an aromatic nucleus or by reacting one or more halogenated monomers with polymeric substances containing aromatic groups, such as Reaction product of polyvinylchloride and carbazole
Reaction product of polyvinylchloride and N-methylphenothiazine
Reaction product of polyvinylchloride and N-ethylcarbazole
Reaction product of polyvinylchloride and naphthalene.

B. In the class of the polycondensates, the polyesters and copolyesters of the type disclosed in U.S. patent application Serial No. 702,252, filed December 12, 1957; U.S. patent application Serial No. 725,498, filed April 1, 1958; U.S. patent application Serial No. 731,874, filed April 30, 1958; U.S. patent application Serial No. 797,587; British patent application No. 543/60, filed January 6, 1960; Belgian patent application No. 39450, filed December 22, 1959; German patent application No. G 29246, filed March 16, 1960; Belgian patent application No. 39631, filed March 18, 1960, Belgian Patent No. 585,556 and in U.S. patent application Serial No. 11,128, filed February 26, 1960 such as Polyester of diphenyl-p,p'disulphonic acid and 2,2-bis(4-hydroxyphenyl)-propane
Polyester of fumaric acid and 2,2-bis(4-hydroxyphenyl)-propane
Polycarbonate of 2,2-bis(4-hydroxyphenyl)-propane
Copolyester of diphenyl-p,p'-disulphonic acid and of p-phenylene diacrylic acid with 2,2-bis(4-hydroxy-3-methyl-phenyl)-propane
Polyester of azobenzene-p,p'-disulphonic acid and 2,2-bis(4-hydroxy-3-methylphenyl)-propane
Polyester of 2,2-bis(4-hydroxyphenyl)-propane and p-carboxymethoxy cinnamic acid
Polyester of terephthalic acid and bis(4-hydroxyphenyl)-phenylmethane
Polyester of diphenylmethane-4,4'-di-sulphonic acid and 1,1-bis(4-hydroxyphenyl)-cyclohexane
Polyester of 4,4-bis(4-hydroxyphenyl)2-methyl pentane and isophthalic acid
Polyester of p,p'-dicarboxydiphenyl ether and 2,2-bis(4-hydroxyphenyl)-propane
Polyester of thiocarbonic acid and 2,2-bis(4-hydroxyphenyl)-propane
Copolyester of fumaric acid with 2,2-bis(4-hydroxyphenyl)-propane and bis(4-hydroxyphenyl)-methyl-phenyl-methane in the ratio 50/50
Polyester of bis(4-carboxyphenyl)-dichloromethane and 2,2-bis(4-hydroxyphenyl)-propane.

(C) In the class of the polysaccharides:
(1) Cellulose-derivatives such as

Cellulose-aceto-N-phenylcarbamate
Cellulose-acetocinnamate
Cellulose-acetobenzoate
Cellulose-acetostearate and
(2) amylose-acetate.

The following are examples of radiation sensitive substances which may be used for producing a remanent increase of the conductivity in the irradiated areas of a photoconductive layer or sheet mainly consisting of one or more of the organic polymeric photoconductive substances of the type described hereinbefore.

(A) Radiation-sensitive diazonium salts having the general formula

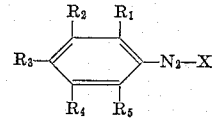

wherein $R_1$, $R_2$, $R_3$, $R_4$ and $R_5$ each represent a hydrogen atom, a halogen atom, a carboxylic acid group, a sulphonic acid group, a hydroxyl group, an alkyl group, an arly group, an aralkyl group, an alkoxy group, an aryloxy group, an amino group and a substituted amino group such as a dialkylamino group, a diarylamino group, an alkoylamino group, an aroylamino group, a sulphonyl amino group, a N-morpholine group and a N-piperidino group and, two and two, may represent the necessary atoms to close a carbocylclic or a heterocyclic ring, and whereby $R_1$, $R_3$ or $R_5$ can also represent an arylazo group; and X represents an anion such as a halogen ion, $HSO_4^-$, $SO_4^{--}$, $BF_4^-$, $HgCl_3^-$ and $\frac{1}{2}ZnCl_4^{--}$, a sulphonic acid group or a $SO_2R_6$ group wherein $R_6$ represents an alkyl group, a substituted alkyl group, an aryl group, a substituted aryl group, an aralkyl group, a substituted aralkyl group, a heterocyclic radical or a substituted heterocyclic radical.

In the following table are listed some compounds according to the above general formula:

| No. | $R_1$ | $R_2$ | $R_3$ | $R_4$ | $R_5$ | X |
|---|---|---|---|---|---|---|
| 1 | H | H | $-N\begin{matrix}CH_3\\CH_3\end{matrix}$ | H | H | $\frac{1}{2}ZnCl_4^{--}$ |
| 2 | H | H | $-NH-\langle\ \rangle$ | H | H | $HSO_4^-$ |
| 3 | H | $OC_2H_5$ | $-NHCO-\langle\ \rangle$ | H | $OC_2H_5$ | $\frac{1}{2}ZnCl_4^{--}$ |
| 4 | H | $OC_2H_5$ | $-NHCO-\langle\ \rangle$ | H | $OC_2H_5$ | $BF_4^-$ |
| 5 | H | $OC_2H_5$ | $-NHCO-\langle\ \rangle$ | H | $OC_2H_5$ | $HgCl_3^-$ |
| 6 | H | $OC_2H_5$ | $-NHCO-\langle\ \rangle$ | H | $OC_2H_5$ | $\frac{1}{2}SO_4^{--}$ |
| 7 | H | $OCH_3$ | $-NHCO-\langle\ \rangle$ | H | $OCH_3$ | $\frac{1}{2}ZnCl_4^{--}$ |

| No. | R$_1$ | R$_2$ | R$_3$ | R$_4$ | R$_5$ | X |
|---|---|---|---|---|---|---|
| 8 | H | H | —N=N—⟨⟩—NO$_2$ | H | H | ½ZnCl$_4$— |
| 9 | H | H | ⟨o-tolyl-NH—⟩ | H | H | Cl— |
| 10 | H | H | —N(C$_2$H$_5$)$_2$ | H | H | —SO$_2$—⟨⟩—NHCOCH |
| 11 | H | H | H | H | H | —SO$_3$Na |
| 12 | OC$_2$H$_5$ | H | H | H | H | SO$_3$Na |

(B) Many commercially available diazotype salts, the structure of which is not disclosed by the manufacturers, give excellent results in the present invention, such as e.g.

Diazotypie Salz BB manufactured by Farbwerke Hoechst/ Werk Naphtolchemie Offenbach
Diazotypie Salz BC manufactured by Ferbwerke Hoechst/ Werk Naphtolchemie Offenbach
Diazotypie Salz S manufactured by Farbwerke Hoechst/ Werk Naphtolchemie Offenbach
The diazo salts manufactured by Andrews Paper & Chemical Co. Inc., New York, N.Y., especially the diazo salts Nos. 11, 12, 22, 28 and 32.

The necessary amount of radiation sensitive substance is not critical, and may vary between 0.01 to 10% (preferably between 0.5 and 2%) of the weight of polymeric photoconductor used. The concentration used will depend on factors such as activity, solubility and color of the radiation sensitive substance.

Some of the polymeric substances and some of the radiation-sensitive substances described hereinbefore as suitable for the manufacture of the electro-photographic materials which can be used for obtaining latent conductive images according to the method of the present invention have previously been described as suitable when used in combination for the manufacture of printing plates by the application of a photopolymerization or photocross-linking process. In this respect we may refer inter alia to U.S. patent specifications 1,587,270, 1,587,272, 1,587,273 and to the German patent specification 832,546. It is to be noted, however, that in the process for obtaining the latent conductive images according to the present invention insolubilization of the polymer by photocrosslinking either does not occur, or if it does occur, does not play a role of any importance in the image-recording process; the illumination necessary for obtaining the initial conductive latent image is much smaller than the illumination necessary for inducing the cross-linking necessary for the insolubilization in the polymeric substance. Moreover, in carrying out the present invention, the radiation-sensitive substances may be used and generally will be used in a quantity much smaller than that used in the photopolymerization process.

Although the mechanism of the phenomena involved in the production of latent conductive images according to the method of the present invention is not completely understood, it is possible that the radiation sensitive substances are themselves dissociated by irradiation to form ions and/or are decomposed to form free radicals which only slowly recombine in the dark, whereby the electronic and/or ionic conductivity of the photoconductive layer or sheet is selectively increased in the irradiated areas in such a way that a ramanent conductive latent image (i.e. a conductive latent image which may persist in the dark for a long period of time) is obtained.

In the manufacture of the electrophotographic materials for carrying out the image-recording process of the present invention, the organic polymeric photoconductive substances can, together with the radiation sensitive substances be worked up into self-supporting sheets or applied as a layer to a suitable support.

When employing the organic polymeric photoconductive substances worked up into a self-supporting sheet the backing may be a thin metal sheet, if the case may be anchored to the photoconductive sheet by means of a suitable subbing layer, or a thin metal layer formed by vacuum evaporation, or a layer comprising a finely divided metal powder and a binding agent, the latter being used in an amount as small as possible. Suitable conductive backings for the photoconductive polymeric sheets can also be found for instance among the coatings described as subbing layers in U.S. patent application Serial No. 509,333, filed May 18, 1955 (for polyester films), Belgian Patent No. 569,129 and U.S. patent application Serial No. 826,129, filed July 10, 1959 (for polyalkylene films).

When employing the organic polymeric photoconductive substance applied as a layer to a suitable support, various techniques can be applied.

As support for the photoconductive layer may be used an electrically conductive plate or sheet, or an insulating plate or sheet provided with an electrically conductive layer. Under electrically conductive plate, sheet or layer is understood a plate, sheet or layer the specific resistivity of which is smaller than that of the photoconductive layer i.e. in general smaller than $10^9$ ohm. cm. Supports the specific resistivity of which is smaller than $10^5$ ohm. cm. are preferably used.

Suitable insulating plates are e.g. glass plates; these plates must be coated with a conductive layer, e.g. with a transparent layer of silver, gold or stannous oxide deposited thereon e.g. by vacuum evaporation.

Suitable insulating sheets are for instance films of synthetic macromolecular substances with high specific resistivity such as for instance the polysulphonates described and claimed in U.S. patent application Serial No. 797,587, filed March 6, 1959, polyesters such as those described and claimed in U.S. patent applications Serial No. 702,252, filed December 12, 1957, Serial No. No. 725,498, filed April 1, 1958, Serial No. 731,874, filed April 30, 1958, polystyrene, polyethylene, cellulose esters etc. or sheets of paper with high specific resistivity. The insulating sheets must be provided with a conductive coating e.g. with a thin metal sheet, with a layer comprising a metal powder dispersed in the smallest possible amount of binding agent, or with a thin hydrophilic layer comprising a hygroscopic and/or antistatic compound and a hydrophilic binding agent. Suitable hygroscopic and/or antistatic compounds are for instance glycerine, glycol, polyethylene glycols, calcium chloride, sodium acetate, condensation products of maleic acid and polyethylene glycols, citric acid amides, hydroxypropyl sucrosemonolaurate, quaternary ammonium compounds such as Antistatin LF (trade name of Badische Anilin- & Soda- Fabrik A.G., Ludwigshafen/ Rh.), Arquad 16 and Ethoquad 18/25 (trade names of Armour and Company, Chicago, Ill.) amine salts of lyophilic alkylphosphates such as Zelec NK (trade name of E. I. du Pont de Nemours & Co. (Inc.), Wilmington, Del.), lyophilic dialkylpolyoxyalkylene phosphates such as Victawet 12 (trade name of Victor Chemical Works, Chicago, Ill.) and polyoxyalkyleneamides such as Ethomid HT/60 (trade name of Armour and Company, Chicago, Ill.) Suitable hydrophilic binding agents are for instance gelatin, glue, polyvinyl alcohol, methylcellulose, carboxymethylcellulose, cellulosesulphate, cellulose hydrogen phthalate, cellulose-acetatesulphate, hydroxyethyl cellulose, polyacrylic acid or colloidal silica; for obtaining a good adhesion of the hydrophilic layer and the hydrophobic polymeric sheet, the polymeric sheet can be provided with a suitable subbing layer such as for instance one of the subbing layers described in U.S. patent application Serial No. 509,333, filed May 18, 1955 (for polyester films), the British Patent 819,-592 and British patent application No. 41732/58, filed December 24, 1958 (for films of polystyrene and substituted polystyrene), U.S. patent application Serial No. 826,129, filed July 10, 1959, and the Belgian Patent No. 569,129, (for polyalkylene films), U.S. Patent 2,867,-542 (for cellulose ester films), and Belgian Patent No. 573,005 (for hydrophilic layers with polyvinyl alcohol as binding agent).

Suitable conductive plates are for instance plates of metals such as aluminum, zinc, copper, tin, iron or lead.

Suitable conductive sheets are for instance films made of polymeric substances with low specific resistivity such as for instance polyamide films or paper sheets with low specific resistivity. Good results can be attained by using paper sheets containing hygrospopic and/or antistatic substances as described hereinbefore. These hygroscopic and antistatic substances are preferably incorporated into the paper sheets during the paper manufacturing process either by adding them to the paper pulp or by an after-treatment, before or after calendering the paper sheets. These substances can likewise be incorporated into the paper sheets by applying to the raw paper stock a composition containing the hygroscopic and/or the antistatic substances and a hydrophilic binding agent as described hereinbefore.

Besides the usual paper sorts can likewise be used synthetic paper sorts such as those prapared from polyesters, e.g. Dacron and Terlenka-fibers (trade names for polyester fibers from terephthalic acid and glycols manufactured by E. I. du Pont de Nemours & Co. (Inc.), Wilmington, Del., resp., Algemene Kunstzijde Unie N.V., Arnhem, Netherlands), from polyamide fibers such as Enkalon-fibers (trade name of Algemene Kunstzijde Unie N.V., Arnhem, Netherlands) or nylon-fibers or from polyacrylonitrile fibers such as Orlon-fibers (trade name of E. I. du Pont de Nemours & Co. (Inc.), Wilmington, Del.). Before coating the photoconductive layers on such paper sheets, the latter are preferably impregnated with substances enhancing their conductivity, for instance polycaprolactam, the polyester of 2,5 - di(p - oxyphenyl) - 1,3,4 - oxadiazol and 1-chloro-3-aminobenzene-4,6-disulphochloride, a copolyamide of hexamethylenediamine, caprolactam, adipic acid and sebacic acid, N-methylene polyhexamethylene adipamide or polyamides such as Ultramid 1 C (trademark for a polyamide manufactured by Badische Anilin- & Soda-Fabrik A.G., Ludwigshafen/Rh.).

Good results have been attained when using as backing paper sheets with low specific resistivity provided with a coating of a polymeric substance in order to obtain a smooth surface and to prevent the organic liquid wherein the organic polymeric photoconductive substance and the radiation sensitive substance are dissolved or dispersed from penetrating within the paper sheet. This coating, however, must not prevent the carrying-off of the electrons from the exposed image areas during the irradiation. Suitable coatings are for instance coatings with a thickness of 2 to $10\mu$ and composed of one or more of macromolecular compounds such as e.g. natural resins, such as dammar resin, elemi-resins, gum arabic, Manila gum and sandarac resin; micro-crystalline waxes; modified natural substances such as cellulose diacetate and cellulose triacetate, cellulose acetobutyrate, ethyl cellulose, ethyl cellulose stearate or other cellulose derivatives, pentaerythrite polyesters or other modified colophonium resins and ester gums; polymerisates such as polyethylene, polystyrene and copolymers of styrene, polyvinylacetate and copolymers of vinylacetate, polyvinylacetals of formaldehyde, acetaldehyde, butyraldehyde, polyacrylic acid esters and polymethacrylic acid esters and coumarone-indene resins; and polycondensates such as glycerol-phthalate resins and other glyceryl polyesters, alkyd resins, polyethylene glycol esters, diethylene glycol polyesters, formaldehyde resins and silicone resins. If desired plasticizers can be added such as for instance dibutylphthalate, dimethylphthalate, dimethylglycol phthalate, tricresylphosphate, triphenylphosphate and monocresyldiphenylphosphate etc. Especially good results were attained when using in the preparation of this pre-coat one or more of the organic polymeric photoconductive substances of the types described hereinbefore.

It has been found that in some cases improved results can be attained by including into this pre-coat electron-acceptor compounds such as e.g. m-amino acetophenone and tetranitrofluorenone.

In the prepartion of the photoconductive layer various techniques can be applied as regards the method for applying the organic polymeric photoconductive substance to the support as well as the method for incorporating the radiation sensitive substance into the photoconductive layer.

In practice the organic polymeric photoconductive substance involved, or a blend of such substances, is, together with at least one radiation-sensitive substance, preferably first dissolved or dispersed in a suitable organic solvent such as for instance benzene, acetone, methylene chloride, dioxane, dimethylformamide or glycol monomethylether, or in a mixture of two or more of such solvents. The solution or dispersion thus obtained is uniformly spread on a surface of a suitable support, for instance by centrifuging, spraying, brushing or coating whereafter the layer formed is dried in such a way that a uniform photoconductive layer is formed on the surface of the support.

The thickness of the photoconductive layers is not critical, but is open to choice within a wider range according to requirements in each individual case. Good results are attained with photoconductive layers of a thickness between 1 and $20\mu$ preferably between 3 and $10\mu$. Layers which are too thin do not have a sufficient insulating power and layers which are too thick require extensive exposure times.

There can be present in the photoconductive layer monomeric or polymeric compounds which confer the properties desired to the photo-conductive layer and/or to the coating composition wherefrom this layer is formed.

In this way, plasticizers such as dibutylphthalate, dimethylphthalate, dimethylglycol phthalate, tricresylphosphate, triphenyl phosphate, monocresyldiphenyl phosphate etc. may be added to the polymeric substances used in the photoconductive layer in amounts of 10 to 30% of the polymer weight.

Other additives, well known in the art of coating technique, which may be used, include pigments, and agents controlling viscosity, free flow, aging and thermal stability, oxidation and/or gloss. In selecting such additives, preference is given to those substances which do not markedly impair the dark resistivity of the photoconductive layer.

As regards the method for incoporating the radiation sensitive substance into the photoconductive layer, it is also possible first to apply to the support a layer of the organic polymeric substance and, after drying, to impregnate said layer with a solution of the radiation sensitive substance.

The electrophotographic process according to the present invention comprises the steps of (1) exposing to a light- or other radiation-image an electrophotographic material comprising a photoconductive layer or sheet mainly consisting of an organic polymeric photoconductive substance or of a blend of such organic polymeric photoconductive substances, and containing also in a minor amount a radiation sensitive substance which produces a remanent increase of the conductivity in the irradiated areas of the photoconductive layer or sheet whereby a conductive latent image is obtained, and (2) producing a visible image either on the electrophotographic material which has been used for obtaining the conductive latent image or on another suitable support, starting from said conductive latent image.

Since the exposure creates a conductive latent image which will persist in the dark within the electrophotographic material for a relatively long period of time, without loss of accuracy or quality, the exposure to the light- or other radiation-image can be carried out in places where no facilities for electrostatic charging are available and by using the usual printing equipment.

At a convenient time after the exposure, the exposed electrophotographic material bearing the conductive latent image is used for the production of one or more visible prints.

According to one embodiment of the present invention, the conductive latent image is transformed into a visible image by applying an electrostatic charge to the exposed electrophotographic material. This electrostatic charging of the electrophotographic material can be effected according to one of the methods known in electrophotography, for instance by corona discharge, by contact charge or by discharge of a capacitor.

The electrostatic latent image formed is then converted into a visible image either on the electrophotographic material whereon the electrostatic latent image was formed, or on a material onto which the electrostatic latent image was transferred for instance by application of the method as described in the British Patent 772,873.

The conversion of the original or transferred electrostatic latent image into a visible image can occur according to one of the techniques known in electrophotography wherein use is made of the electrostatic attraction or repulsion of finely divided colored substances which for instance are present in a powder mixture, in an electric insulating liquid (for instance in the form of suspension) or in a gas (for instance in the form of aerosol), or of finely divided colored liquid drops which are for instance present in an electrically insulated liquid (for instance in the form of dispersion) or gas (e.g. in the form of aerosol).

By suitable choice of the sign of the charge of the developing powder or developing liquid a negative or positive print can be obtained at will from any original. If both the printing material and developing powder or developing liquid bear the same charge sign, the powder will only adhere to the discharged areas and a print (positive/positive) is obtained with the same image value as the original. If the sign of the material and of the developing powder or developing liquid is different, the image values become reversed (negative/positive).

Besides development according to the methods generally known in electrophotography, also other techniques can successfully be used for instance by applying the method according to U.S. patent applications Serial No. 856,357, filed December 1, 1959, and Serial No. 741,017 filed June 10, 1958.

If a colored powder was used for making visible the latent image, the visible image obtained can, if necessary, be fixed according to one of the methods known in electrophotography, e.g. by heating, or it can be transferred onto another support, for instance according to the method described in the British Patent 658,699 and fixed thereon.

When several prints are to be obtained starting from one and the same conductive latent image, various techniques can be applied. According to a preferred embodiment of the present invention, these steps of charging the exposed sheet (=negative material), developing the electrostatic latent image formed therein and transferring the powder image formed to a transfer sheet (=positive material) in the presence of an electrostatic field are repeatedly carried out. As an alternative the several copies may be produced by repeatedly carrying out the steps of charging the exposed sheet (=negative material), transferring the electrostatic latent image formed thereon to an insulating sheet (=positive material) and developing the transferred electrostatic image.

According to another especially preferred embodiment of the present invention, several copies are obtained starting from the exposed electrophotographic material bearing the conductive latent image by repeatedly carrying out the steps of placing the exposed material in face to face contact with an insulating sheet in the presence of an electric field, and developing the electrostatic latent image produced on the insulating sheet according to one of the techniques known per se. Such a process for obtaining several copies is described in British application No. 3723/60, filed February 2, 1960.

Evidently, the present invention is by no means limited to one or the other particular embodiment as regards the use of the new electrophotographic materials, and the exposure technique, the charging method, the transfer (if any), the developing method and the fixing method as well as the materials used in these methods can be adapted to the necessities.

Electrophotographic materials according to the present invention can be applied in reproducing techniques wherein different kind of radiations, electromagnetic radiations as well as nuclear radiations are used. For this reason, it should be pointed out that although the invention is mainly intended for being applied in connection with methods comprising an exposure, the term "electrophotography" wherever appearing in the description and the claims, must be broadly understood and comprises both xerography and xeroradiography.

The following examples illustrate the present invention without limiting, however, the scope thereof in any way.

EXAMPLE 1

To one litre of a 10% solution of polyvinylacetate in acetone are added 2 cm.³ of a 1% solution in ethanol of the following compound:

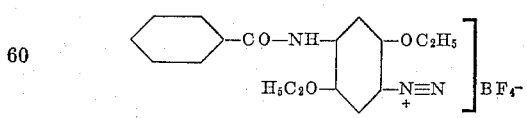

This solution is applied under yellow safe light to a baryta coated paper stock of 110 g./sq. m. After air-drying, the thickness of the layer amounts to 8μ. The material is then exposed for 30 seconds with a "Philips HP 300" bulb to a document at a distance of 5 inches and divided into two parts. Immediately after exposure, the first part is charged with a corona charging device to a positive potential of 500 volts, and developed with a resin-carbon black powder mixture in known way. The second half is processed in exactly the same way, but only after a period of two days. Both images are equally perfect. Analogous results are attained if the polymer is partly or completely substituted by one of the following products: a reaction product of polyvinyl acetophenone with quinoleine-2-aldehyde, a reaction product of polyvinyl acetophenone with 9-anthraldehyde, a copolymer of styrene and acrylonitrile, polymethylmethacrylate, a copolymer of vinylacetate and mono-n-decylmaleate, and a copolymer of nitrostyrene and diethylmaleate.

EXAMPLE 2

This example discloses means to obtain multiple copies by transfer of the electrostatic latent image.

(a) *Negative Material*

The following composition is coated on baryta coated paper stock:

Polyester of 2,2-bis(4-hydroxyphenyl)-propane and
   p-carboxymethoxy cinnamic acid _____ g__ 100
Methylene chloride _____ cm.$^3$__ 500
Tetrachlorethane _____ cm.$^3$__ 500
10% solution of 2,5-diethoxy-4-benzoylaminobenzene diazonium mercuricchloride double salt in dimethylformamide _____ cm.$^3$__ 20

(b) *Positive Material*

The same composition as the negative material but without the diazonium salt is coated on a 90 g./sq. m. paper stock.

The thickness of both dried layers is 11μ. The negative material is exposed for 8 seconds on a Lumoprint LP 3 printer through a line-diapositive.

After charging with a corona device connected to a 7000 volt source, a positive sheet is applied and a corona discharge of 4000 volts is applied to the back of the latter. After removal and subsequent powder development of the positive sheet a clean copy is obtained. By repeating the charging and the transfer, a number of five copies can be achieved.

Similar results can be attained by substituting the polyester of 2,2-bis(4-hydroxyphenyl)-propane and p-carboxymethoxycinnamic acid by one or a blend of the following polymers: reaction product of polyvinyl acetophenone and p-dimethylaminocinnamic aldehyde, poly(2-methyl-6-N-acryl-aminobenzthiazole), reaction product of polyvinylacetophenone and methylcarbazole-2-aldehyde, and the reaction product of polyvinyl acetophenone and 1-naphthaldehyde.

EXAMPLE 3

This example discloses means to obtain multiple copies by transfer of the latent conductive image.

(a) *Negative Material*

A photographic paper stock of 90 g./sq. m. is coated with the following preparation:

Gelatin _____ g__ 300
Water _____ cm.$^3$__ 9700
Titaniumdioxide _____ g__ 600
10% aqueous solution of saponine _____ cm.$^3$__ 300

To this subcoat is applied the following solution: 500 g. of the formaldehyde acetal of polyvinylalcohol and 250 mg. of the compound having the formula

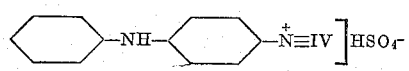

dissolved in 10 liters of ethanol. The thickness of the dried layer is 6μ.

(b) *Positive Material*

To the same paper stock is applied a 5% of ethanol solution of the formaldehyde acetal of polyvinylalcohol, and dried.

A document is reflex-copied on the negative material by exposure on the "Lumoprint LP 3" printer for 7 seconds. This negative matrix is placed in face-to-face contact with a positive sheet, after which a corona discharge of 6000 volts is applied to the rear side of the transfer paper. In this way, an electrostatic latent image is formed on the positive paper and may be rendered visible as by the usual dusting technique. By repetition of the transfer, up to twenty copies are easily obtained. By changing the polarity of the applied transfer discharge, positive or negative copies may be obtained at wish, even alternatingly from the same matrix. Equal results are attained when substituting the formaldehyde acetal of polyvinyl alcohol by one of the following polymers: a polyester of terephthalic acid with bis(4-hydroxyphenyl)-phenylmethane, a polyester of diphenylmethane-4,4'-disulphonic acid with 1,1-bis(4-hydroxyphenyl)-cyclohexane, a copolymer of styrene and butadiene, and poly(1-vinylnaphthalene).

EXAMPLE 4

This example shows how either negative or positive images can be obtained by use of the same material, same charge and same development, simply by a change in exposure time.

The following solution is coated on baryta coated paper stock:

Copolymer of N-vinylcarbazole and ethylacrylate _____ g__ 100
Methylene chloride _____ cm.$^3$__ 800
Tetrachlorethane _____ cm.$^3$__ 200
10% solution of 2,5-diethoxy-4-benzoyl-aminobenzene diazonium chlorozincate in dimethylformamide _____ cm.$^3$__ 18

Exposure of this material for 5 seconds through a negative film, application of negative charge and development with positive powder particles will result in a perfect positive print.

Exposure of the same material for 50 seconds through a positive original, followed by the same treatment will result in a clear positive print.

Since the exposure ranges for negative/positive printing (3 to 12 seconds) and for positive/positive printing (40 to 60 seconds) lay sufficiently apart to avoid overlapping, this technique provides a useful advantage over the well-known art of electrophotography.

Similar results are attained with the copolymer of N-vinylcarbazole and methylacrylate, the copolymer of N-vinylcarbazole and n-butylacrylate and the polyester of 4,4-bis(4-hydroxyphenyl-2-methyl)-pentane and isophthalic acid.

We claim:

1. An electrophotographic copying process which comprises the steps of exposing an uncharged layer consisting essentially of at least one organic polymeric photoconductive insulating substance and a diazonium salt corresponding to the following general formula:

$$[R\!-\!N_2^+]_n X$$

wherein:
   R is an aryl radical,
   X is an anion, and
   n is a positive number equal to the valence of X, uniformly distributed therethrough, imagewise to electromagnetic radiation to which said layer is sensitive, whereby a latent conductive image is produced in said layer, subjecting said layer in absence of electromagnetic radiation to which the layer is sensitive to an electric field to create in said layer a pattern of electrostatic charges in conformity with said latent conductive image, and developing said pattern of electrostatic charges with electrostatically attractable material.

2. The process of claim 1 wherein said salt is present in said layer in the amount of at least about 0.01% by weight of said polymeric substance.

3. The process of claim 1 wherein said layer consists essentially of at least about 95% by weight of said polymeric substance and at least about 0.1% by weight of said salt.

4. The process of claim 1, wherein said layer is associated in intimate face-to-face contact with an electrically conductive backing layer.

References Cited in the file of this patent

UNITED STATES PATENTS

| | | |
|---|---|---|
| 2,845,348 | Kallman | July 29, 1958 |
| 2,919,191 | Walkup | Dec. 29, 1959 |
| 2,951,443 | Byrne | Sept. 6, 1960 |
| 2,956,874 | Giaimo | Oct. 18, 1960 |
| 2,956,878 | Michiels et al. | Oct. 18, 1960 |

FOREIGN PATENTS

| | | |
|---|---|---|
| 1,068,115 | Germany | Oct. 29, 1959 |